(12) United States Patent
Raz et al.

(10) Patent No.: US 8,290,864 B2
(45) Date of Patent: Oct. 16, 2012

(54) METHOD AND SYSTEM FOR FACILITATING CREDIT TRANSACTIONS

(75) Inventors: Ori Raz, Herzeliya (IL); Gil Don, Tel-Aviv (IL); Alon Feit, Tel-Aviv (IL)

(73) Assignee: Pay It Simple Ltd., Ramat Gan (IL)

(*) Notice: Subject to any disclaimer, the term of this patent is extended or adjusted under 35 U.S.C. 154(b) by 664 days.

(21) Appl. No.: 12/344,371

(22) Filed: Dec. 26, 2008

(65) Prior Publication Data

US 2009/0171840 A1    Jul. 2, 2009

Related U.S. Application Data

(60) Provisional application No. 61/016,818, filed on Dec. 27, 2007.

(51) Int. Cl.
*G06Q 40/00* (2006.01)

(52) U.S. Cl. ............................................. 705/40; 705/38
(58) Field of Classification Search ................... 705/35, 705/38, 39, 40
See application file for complete search history.

(56) References Cited

U.S. PATENT DOCUMENTS 7,661,586 B2 * 2/2010 Robbins et al. ............... 235/380
2006/0247975 A1 * 11/2006 Shapiro et al. .................. 705/14

* cited by examiner

*Primary Examiner* — Ojo O Oyebisi
(74) *Attorney, Agent, or Firm* — Vladimir Sherman; Professional Patent Solutions

(57) ABSTRACT

Disclosed is a system and method for Facilitating Credit Transactions, which may allow for the division of a given purchase or cash-withdrawal transaction amount, into periodical installments by enabling the financing of said transaction.

20 Claims, 3 Drawing Sheets

FIG. 3

| Sub Total : | 2663.99 |
|---|---|

Installments

| # of Installments: | 10 ▽ |
|---|---|
| Interest : | 207.14 |

| Total : | 2871.13 |
|---|---|

| First installment : | 287.13 |
|---|---|
| Balance Due: | 2584.00 |

METHOD AND SYSTEM FOR FACILITATING CREDIT TRANSACTIONS

FIELD OF THE INVENTION

The present invention generally relates to the field of financial credit transactions. More specifically, the present invention relates to a system and method for facilitating financial credit installments.

BACKGROUND OF THE INVENTION

People, inherently, in most of the western civilization, spend a significant portion of their life and money on buying products and services. While fulfilling this purchasing "role", they are identified as Consumers. The common, and logical, perception is that for a consumer to be able to purchase her/his desired goods or services, be it day to day needs, assets, presents, travel, etc., she/he is required to have the available financial means, namely "enough money in the bank", or elsewhere.

Several consumption and purchasing mechanisms have been around, some going back to the dawn of history, allowing consumers to purchase goods and services without necessarily having the required funds at the time of purchase, rather using money they do not own to finance the purchase, and pay back at a later stage.

To name a few current such financing schemes:
Bank loans;
Mortgages;
Leasing (cars, etc.); and
Revolving credit card schemes: allowing consumers to pay their credit card expenses gradually (revolving them).

Obviously these financing methods, and others, do not come free of charge. Consumers are usually charged, on top of the purchase cost, financing fees by the institute or body providing the funds that enable the purchase.

It is quite often that such financing mechanisms are used even by consumers having enough immediate funds, but preferring to not spend them on the current purchase, thus controlling their cash flows, just like any business firm does.

Possible reasons for such behavior may include:
A future expense is expected and will require available funds;
The current purchase, for which a "loan" is taken, is about to exceed the consumer's periodical budget/salary;
Money is invested and cannot be used; and
Emotional/Psychological motivations (e.g.: financial security).

The financing solutions are provided by a variety of sources, some providing a general purpose loan, not linked to a specific purchase, and others link the "loan" to a specific purchase/product/service. For example:
General purpose financing:
Credit card issuers (revolving credit accounts, etc.);
Financial institutions: banks, etc. (loans); and
Installment loans.
Specific financing:
Mortgage banks;
Car/other leasing companies; and
Merchants or service providers.
Revolving Credit Card Loans The revolving instrument is a common worldwide credit card industry solution of general purpose loans. In the revolving method, a card holder can decide how much of his monthly credit card expenses he would rather revolve to the next month (within certain limitations).

The financing costs for such instrument are Annual Percent Rate (APR) derived from the national Federal interest rate. It is not fixed, and usually raises a lot above the Federal interest rate.

One reason for the high revolving APRs is the "risk" institutes (Credit card issuers/banks), providing such loans, take: A card holder can try avoiding some or all future payments, when in fact the product or service is already his/hers, in several ways:
Denying the purchase;
Closing the account; or
"Disappearing".
Such cases "expose" the loaning institute to unplanned cost and thus loss of money.

The revolving mechanism is common in the US consumer credit market, due to the popularity of credit cards as a monetary instrument (over 150 million cards in the year 2006), where more than 60% of card holders are using revolving credit line on their cards.

Once a consumer has been approved for a credit line (usually pre approval), it is easy and immediate to use revolving mechanism for any purpose at any time, using his/her credit card. It is though, carrying one of the most expensive interest rates for consumers.

During 2006 the revolving system in the credit card industry at the US only had an outstanding of approximately US$ 826.6 Billion, compared to US$ 1,526.4 Billion in non revolving credit system (e.g.—loans) for consumer spending (excluding housing), most of which is not done through credit cards.

Americans are used to using non-revolving credit (mainly leasing or other periodical pay-back loans) for high value items such as cars, mobile homes, education, boats or vacations. These are usually financed by the manufacturers or financial institutions in fix monthly installments.
Leasing Leasing loans are available in the US, but are mostly limited to specific high ticket purchases, such as cars, houses and boats, provided directly by the merchant and dedicated for the desired consumer product i.e. "specific purchase" loan.

In this case, the purchased product is registered as a grantee for the given loan. The APRs for such loans vary between industries and are usually lower than the APR of the revolving credit card APR's. This kind of credit loan is usually not pre approved as in the case of revolving credit card accounts.

SUMMARY OF THE INVENTION

According to some embodiments of the present invention, as part of a transaction between a merchant and a purchaser/cash-withdrawer of goods and/or services and/or monetary means (e.g. cash), the purchaser/cash-withdrawer may request to split the transaction cost into a set of payments/installments, by which costs are spread over a period of time. Said set of payments and said period of time may be pre-defined or pre-determined.

According to some embodiments of the present invention, as part of a cost spread to installments, a purchaser/cash-withdrawer of goods and/or services and/or monetary means (e.g. cash), may request that a secondary credit provider pay the merchant the cost of the purchased goods and/or services.

According to some embodiments of the present invention, such secondary credit provider may be any third party willing to finance said transaction (e.g. the merchant).

According to some embodiments of the present invention, the transaction amount, provided by the secondary credit provider, including financing fees, may be securitized (e.g.

via a credit line provided to the purchaser/cash-withdrawer by a primary credit provider). Based on said securitization, secondary credit provider may pay the transaction amount, excluding financing fees, to the merchant.

According to some embodiments of the present invention a repeating cycle of re-securitizations may be initiated, wherein each cycle may comprise: a re-securitization of the remaining balance; and a request for the current payment, based on to the terms pre-agreed upon by purchaser/cash-withdrawer, to be transferred to the secondary credit provider (e.g. through a credit line provided to the purchaser/cash-withdrawer by a primary credit provider).

According to some embodiments of the present invention, said repeating cycle may terminate after all due payments were transferred to said secondary credit provider. In the event of a re-securitization failure, said secondary credit provider may request the primary credit provider to transfer the full remaining balance from purchaser/cash-withdrawer to it, based on the last prior credit securitization performed.

According to some embodiments of the present invention, all existing or future types of transactions between a merchant and a purchaser/cash-withdrawer of goods and/or services and/or monetary means (e.g. cash) may be supported (e.g. online/internet; point of sale; automatic teller machine,).

According to some embodiments of the present invention, there is provided a method for facilitating credit based transactions associated with purchase of a good or service having a cost. According to some embodiments of the present invention, data indicating the cost of a good or service may be received over a data network. The cost of the transaction may then be securitized over a data network against a credit line provided by a primary credit provider. Upon securitization, a secondary credit provider may fund the transaction. The secondary credit provider may intermittently receive partial payment of the transaction's cost while concurrently re-securitizing an outstanding transaction balance.

According to some embodiments of the present invention, partial payment of the transaction's cost may be received either from the primary credit provider or directly from a purchaser of the good or service. According to some embodiments of the present invention, upon a re-securitizing failure, secondary credit provider may receive full balance payment from the primary credit provider.

According to some embodiments of the present invention, a partial payment received by the secondary credit provider may be one of a set of equal or one of a set of non-equal partial payments. Sizes and timings of received payments may be determined according to a predefined payment schedule, further, the partial payment may be substantially equal to the funded amount plus financing fees, divided by the number of payments to be made.

According to some embodiments of the present invention, securitizing and/or re-securitizing of the cost(s) of the transaction over a data network may consist of issuing a credit request and receiving credit authorization. According to some embodiments of the present invention, intermittent receipt of partial payment may further include receipt of transaction related financing costs and/or receipt of commission costs.

According to some embodiments of the present invention, a transaction system may comprise of one or more transaction servers including a collective control logic adapted to: (1) receive over a data network the data indicating the cost of a good or service; (2) securitize over a data network the cost of the transaction against a credit line provided by a primary credit provider; (3) fund the transaction upon securitization; (4) intermittently receive partial payment from the primary credit provider; and (5) intermittently re-securitize an outstanding balance.

According to some embodiments of the present invention, a securitization module may be adapted to receive over a data network the data indicating the cost of a good or service. The data may be received from a merchant agent selected from a group consisting of Terminal Merchant Agent, On-Line Merchant Agent, Check-out Provider Agent and Cash Withdrawal Agent. The securitization module may be further adapted to receive data relating to the number and/or sum(s) of said partial payments. According to some embodiments of the present invention, the securitization module may be adapted to securitize the cost of the transaction against a credit line provided by a primary credit provider, a securitization may comprise of initiating a credit request and receiving a credit authorization.

According to some embodiments of the present invention, a funds transfer module may be adapted to fund of the transaction upon its securitization (e.g. by transfer of funds to merchant of goods/services). According to some embodiments of the present invention, a fund receipt module may be adapted to intermittently receive partial payment or to receive full payment, from the primary credit provider. The fund receipt module may be further adapted to receive full balance payment from the primary credit provider upon a re-securitization failure.

According to some embodiments of the present invention, the securitization module may be further adapted to intermittently re-securitize an outstanding balance. A re-securitization may comprise of initiating a credit request and receiving a credit authorization.

BRIEF DESCRIPTION OF THE EXEMPLARY FIGURES

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying exemplary figures in which:

FIG. 3 is an image of an exemplary transaction payment arrangement, in accordance with some embodiments of the present invention; and Appendix A is a description of an exemplary system and method for facilitating credit transactions in accordance with some embodiments of the present invention wherein:

Figure 1:
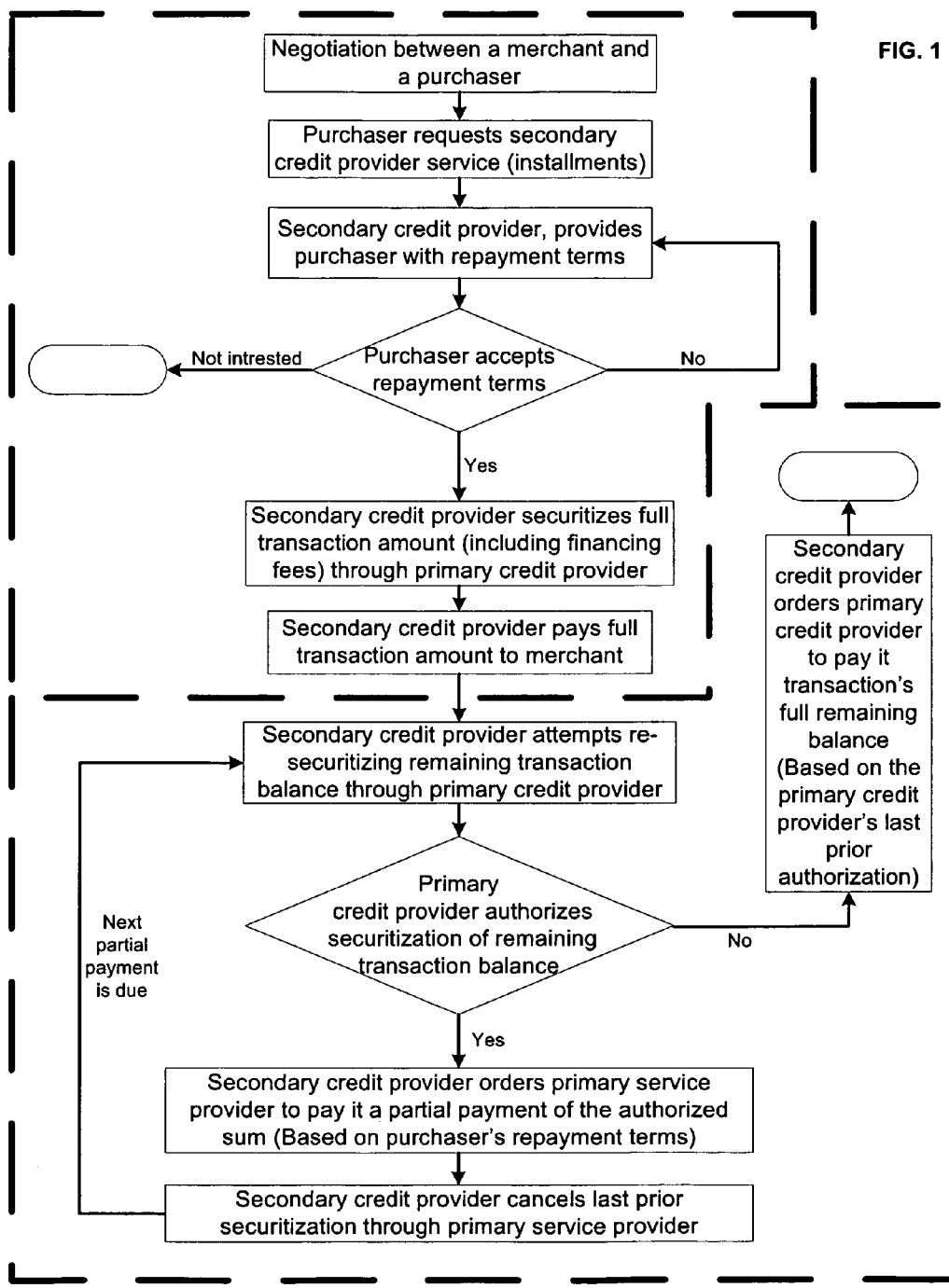
FIG. 1 is a flow chart describing the stages and steps of an exemplary method for facilitating installment transactions, in accordance with some embodiments of the present invention.
Figure 2:
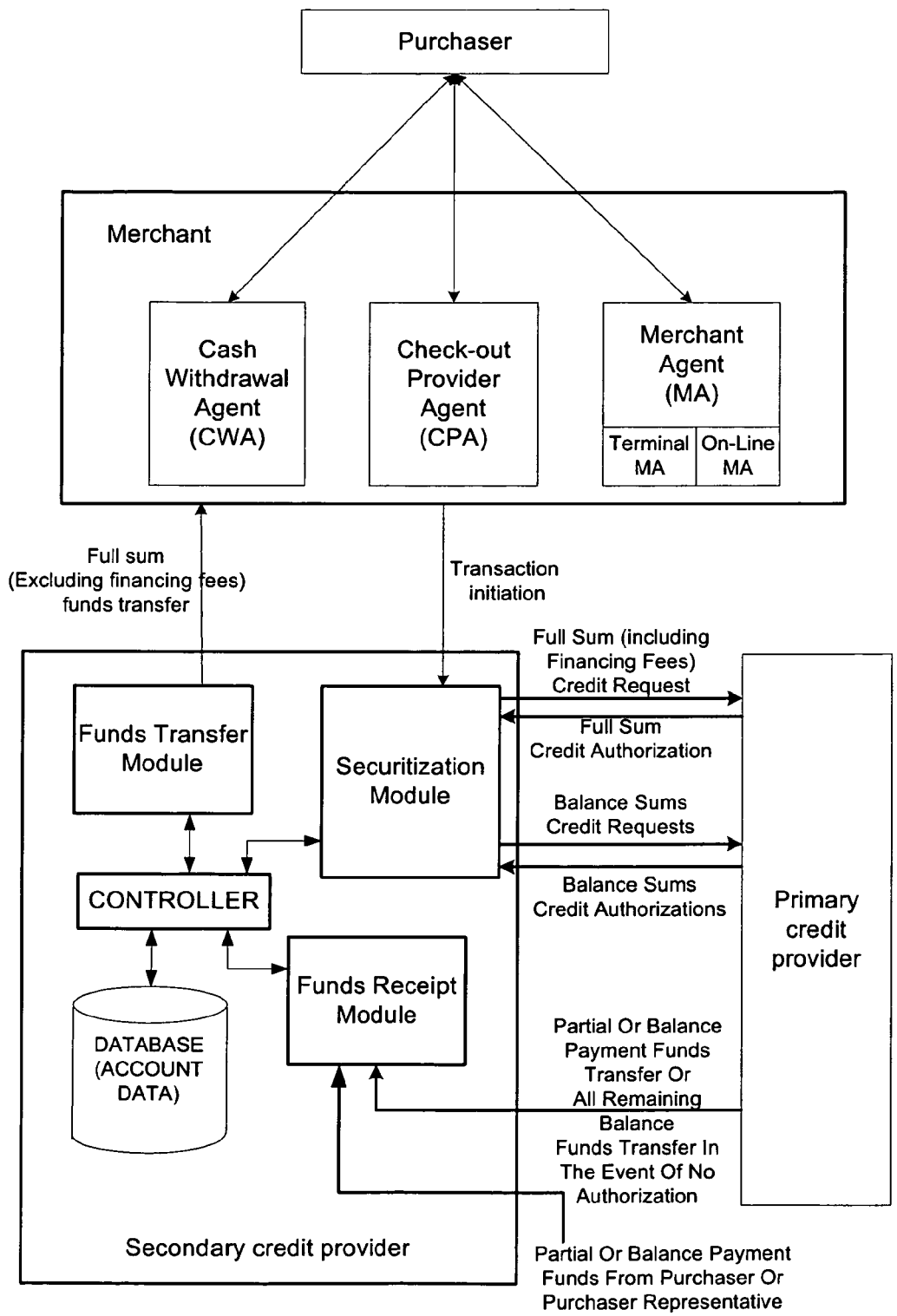
FIG. 2 is a table describing the modules of an exemplary system for facilitating transactions, in accordance with some embodiments of the present invention.

Primary Credit Provider—may also be regarded as a credit card issuer (backed up by the card holder's credit/bank/other account);

Secondary credit provider—May also be regarded to as the Invention, The invention system or simply as the System. This however, shall not limit the present invention's embodiments, functions or abilities—to those of the Secondary credit provider as described in the present application;

Credit securitization—May Comprise of some or all of the following steps, regarded to as Credit request, Credit authorization and Credit clearing that may be accompanied by a corresponding time period and amount;

Purchaser/cash-withdrawer—May also be regarded to as Buyer, Consumer, Costumer, Credit Card holder or simply as the Card holder; and A partial payment (based on the repayment terms between the secondary credit provider and the purchaser/cash-withdrawer)—May also be regarded to as an Installment.

DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, or a man operated such system, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. Such apparatus may be specially constructed for the desired purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

The present invention is a system and method for facilitating a transaction. According to some embodiments of the present invention, as part of a transaction between a merchant and a purchaser/cash-withdrawer of goods and/or services and/or monetary means (e.g. cash), which may be initiated at or through any point of access (e.g. online, point of sale, automatic teller machine), the purchaser/cash-withdrawer may request to split the transaction cost into a set of payments/installments, by which costs may be spread over a period of time. Said set of payments and said period of time may be pre-defined or pre-determined.

According to some embodiments of the present invention, as part of a cost spread to installments, a purchaser/cash-withdrawer of goods and/or services and/or monetary means (e.g. cash), may request that a secondary credit provider pay the merchant the cost of the purchased goods and/or services. Said secondary credit provider may be any third party willing to finance said transaction (e.g. the merchant).

According to some embodiments of the present invention, the secondary credit provider may provide the purchaser/cash-withdrawer with repayment terms (e.g. monthly payments/installments) for the principle amount to be paid by the secondary provider and/or for financing fees (e.g. interest). The secondary credit provider may securitize the amounts to be paid to the merchant with a credit line provided to the purchaser/cash-withdrawer by a primary credit provider (e.g. credit card company). Concurrent with or prior to payment to merchant, the financing party (e.g. secondary credit provider) may request from the primary credit provider credit authorization for the remaining amounts due, including financing fees (e.g. interest).

According to some embodiments of the present invention, the secondary credit provider may request from the primary credit provider partial payment of the authorized credit based on the agreed upon repayment terms between the secondary credit provider and the purchaser/cash-withdrawer. Since each credit authorization expires either within a predefined period of time or based on some action, the secondary credit provider may re-securitize any remaining balance owed to it by the purchaser/cash-withdrawer by intermittently re-requesting credit authorization for the remaining balance.

According to some embodiments of the present invention, the above re-securitization and money transfer cycle may be re-executed until all due payments are transferred to the secondary credit provider. In the event of a re-securitization failure, said secondary credit provider may request the primary credit provider to transfer the full remaining balance from purchaser/cash-withdrawer to it, based on the last prior credit securitization performed.

According to further embodiments of the present invention, by re-securitization of some or all of the remaining balance owed to the secondary credit provider, just prior to, in parallel or just after purchaser's/cash-withdrawer's payment of each installment (i.e. prior/in parallel/after the expiration [time or action initiated] of each former credit securitization), risk of non-collectable sums may be reduced or minimized.

According to some embodiments of the present invention, a charge-back procedure may be initiated as a result of a product or service not provided, rightly returned or for any other reason which may justify refund of some or all of the purchase or financing fees, to the purchaser and/or to other parties. The financing party (e.g. Secondary credit provider) may retrieve the 'charged back' transaction details and may accordingly debit the merchant on part of or on the entire purchase amount. Out of the debited amount, it may order the primary credit provider to refund, or otherwise refund, some of or the entire purchaser's already paid amounts and some of or the entire amounts, not yet paid to it by the purchaser.

According to some embodiments of the present invention, said method may be used to externally orchestrate, or may allow or enable for the collaboration of one or more independent, external or internal entities—of any purchaser/cash-withdrawer, credit provider, merchant, acquirer, issuer or other, in order to facilitate the Installments method described hereinbefore. Furthermore an external or modular financing of these Installments transactions (e.g. by an external/$3^{rd}$ party/secondary credit provider) may be utilized and may enable for one or more secondary credit financing sources, or for the withdrawal of cash from different merchants, which may or may not be specifically customized for this type of service and may or may not be the withdrawal transaction's financing entity.

According to some embodiments of the present application, there is provided a transaction system adapted to facilitate credit transactions between a merchant, and a purchaser/cash-withdrawer of goods and/or services and/or monetary means (e.g. cash), which may be initiated at or through any point of access (e.g. online, point of sale, automatic teller machine).

As part of the transaction system, or functionally associated with the transaction system, there may be provided a merchant agent, checkout provider agent or cash withdrawal agent module. The merchant agent, checkout provider agent or cash withdrawal agent module, which may be accessed through any point of access (e.g. online, point of sale, automatic teller machine/ATM), may be adapted to offer the purchaser/cash-withdrawer with repayment terms for the principle amount to be paid to the merchant by the financing party (e.g. secondary credit provider) and for financing fees (e.g. interest), by which costs may be spread over a period of time (e.g. monthly payments, installments), and initiate such a transaction upon approval by said purchaser/cash-withdrawer.

As part of the transaction system, or functionally associated with the transaction system, there may be provided a securitization module. The securitization module may be adapted to securitize the amounts to be paid to the merchant plus financing fees (e.g. interest) by requesting credit authorization for the full amount form a primary credit provider (e.g. credit card company), possibly by using a credit line provided to the purchaser/cash-withdrawer. Said securitization module may be further adapted to request from the primary credit provider credit authorization for the remaining amounts due, including financing fees (e.g. interest) concurrent with or prior to payment to merchant.

As part of the transaction system, or functionally associated with the transaction system, there may be provided a money transfer module. The money transfer module may be adapted to order, upon said primary credit provider authorization, the transferring of the full purchase/cash-withdrawal amount excluding financing fees (e.g. interest) from a secondary credit provider to the merchant According to some embodiments of the present invention, said securitization module may be further adapted to re-securitize any remaining balance owed to the secondary credit provider by the purchaser/cash-withdrawer by intermittently re-requesting credit authorization for the remaining balance. Said money transfer module may be further adapted to request, upon re-securitization of the remaining balance, the primary credit provider to transfer the amount of the current payment according to pre-agreed repayment terms (e.g. monthly payments) from purchaser/cash-withdrawer to the secondary credit provider.

According to some embodiments of the present invention, the above re-securitization and money transfer cycle may be re-executed until all due payments are transferred to the secondary credit provider. In the event of a re-securitization failure, said money transfer module may be further adapted to request the primary credit provider to transfer the full remaining balance from purchaser/cash-withdrawer to the financing party (e.g. secondary credit provider), based on the last prior credit securitization performed.

According to further embodiments of the present invention, said securitization module may be adapted to re-securitize some or all of the remaining balance owed to the secondary credit provider, just prior to, in parallel or just after purchaser's/cash-withdrawer's payment of each installment (i.e. prior/in parallel/after the expiration [time or action initiated] of each former credit securitization) thus reducing or minimizing the risk of non-collectable sums.

According to some embodiments of the present invention the second credit provider may be adapted to handle a charge-back procedure initiated as a result of a product or service not provided, rightly returned or for any other reason which may justify refund of some or all of the purchase or financing fees, to the purchaser and/or to other parties. Secondary credit provider may be further adapted to retrieve the 'charged back' transaction details and may accordingly debit the merchant on part of or on the entire purchase amount. Out of the debited amount, it may order the primary credit provider to refund, or may otherwise refund, some of or the entire purchaser's already paid amounts and some of or the entire amounts, not yet paid to it by the purchaser.

According to some embodiments of the present invention, said system may be adapted to externally orchestrate, or may allow or enable, for the collaboration of one or more independent, external or internal entities—of any purchaser/cash-withdrawer, credit provider, merchant, acquirer, issuer or other, in order to facilitate the Installments method described hereinbefore. Furthermore, said system may be adapted to allow for the utilization of external or modular financing of these Installments transactions (e.g. by an external/$3^{rd}$ party/secondary credit provider) and thus may enable for one or more secondary credit financing sources, and/or for the withdrawal of cash from different merchants, which may or may not be specifically customized for this type of service and may or may not be the withdrawal transaction's financing entity.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A method for facilitating credit based transactions associated with purchase of a good or service having a cost, said method comprising:
   receiving over a data network the data indicating the cost of a good or service;
   securitizing over a data network the cost of the transaction against a credit line provided by a primary credit provider;
   funding the transaction upon securitization;
   intermittently receiving partial payment; and
   intermittently re-securitizing an outstanding balance.

2. The method according to claim 1, wherein partial payment is received from the primary credit provider.

3. The method according to claim 2, wherein partial payment is received from a purchaser of the good or service.

4. The method according to claim 1, further comprising:
   receiving full balance payment from the primary credit provider upon a re-securitizing failure.

5. The method according to claim 1, wherein intermittently receiving partial payment includes receiving one of a set of equal partial payments according to a predefined payment schedule.

6. The method according to claim 5, wherein the partial payment is substantially equal to the funded amount plus financing fees and divided by the number of payments to be made.

7. The method according to claim 1, wherein intermittently receiving partial payment includes receiving one of a set of non-equal partial payments.

8. The method according to claim 1, wherein securitizing the cost of the transaction over a data network comprises issuing a credit request and receiving credit authorization.

9. The method according to claim 1, wherein intermittently re-securitizing an outstanding balance comprises issuing credit request and receiving credit authorization.

10. The method according to claim 1, wherein intermittently receiving partial payment further includes receipt of transaction related financing costs.

11. The method according to claim 1, wherein intermittently receiving partial payment further includes receipt of commission costs.

12. A transaction system comprising:
one or more transaction servers including collective control logic adapted to: (1) receive over a data network the data indicating the cost of a good or service; (2) securitize over a data network the cost of the transaction against a credit line provided by a primary credit provider; (3) fund the transaction upon securitization; (4) intermittently receive partial payment from the primary credit provider; and (5) intermittently re-securitize an outstanding balance.

13. The system according to claim 12, further comprising a securitization module adapted to securitize the cost of the transaction.

14. The system according to claim 13, wherein said securitization module is further adapted to receive data relating to the number and/or sum of said partial payments.

15. The system according to claim 13, wherein said securitization module is further adapted to receive the data indicating the cost of a good or service from a merchant agent selected from a group consisting of Terminal Merchant Agent, On-Line Merchant Agent, Check-out Provider Agent and Cash Withdrawal Agent.

16. The system according to claim 13, wherein said securitization module is further adapted to initiate a credit request and receive a credit authorization as part of securitizing the cost of the transaction.

17. The system according to claim 13, further comprising a funds transfer module adapted to perform the funding of the transaction upon securitization.

18. The system according to claim 13, further comprising a fund receipt module adapted to receive partial or full payment.

19. The system according to claim 18, wherein said funds receipt module is further adapted to receive full balance payment from the primary credit provider upon a re-securitization failure.

20. The system according to claim 13, wherein said securitization module is further adapted to intermittently re-securitize an outstanding balance.

* * * * *